(12) United States Patent
Ide et al.

(10) Patent No.: US 12,031,626 B2
(45) Date of Patent: Jul. 9, 2024

(54) SHIFT DEVICE

(71) Applicant: KABUSHIKI KAISHA TOKAI-RIKA-DENKI-SEISAKUSHO, Aichi-ken (JP)

(72) Inventors: Hirofumi Ide, Aichi-ken (JP); Yoshihiro Noda, Aichi-ken (JP); Kazuhiro Saito, Aichi-ken (JP); Masao Ando, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 17/679,566

(22) Filed: Feb. 24, 2022

(65) Prior Publication Data
US 2022/0275860 A1    Sep. 1, 2022

(30) Foreign Application Priority Data

Feb. 26, 2021  (JP) .............................. JP2021-030763

(51) Int. Cl.
*F16H 59/10*    (2006.01)
*F16H 59/02*    (2006.01)

(52) U.S. Cl.
CPC ......... *F16H 59/0278* (2013.01); *F16H 59/10* (2013.01); *F16H 2059/0282* (2013.01)

(58) Field of Classification Search
CPC ....... F16H 2059/048; F16H 2059/0291; F16H 2059/0282; F16H 59/0278; F16H 61/18; F16H 2061/185

USPC .......................................................... 74/473.3
See application file for complete search history.

(56) References Cited

U.S. PATENT DOCUMENTS

| 4,947,967 | A  | * | 8/1990  | Kito ................. B60R 25/02144 |
|           |    |   |         | 477/96                              |
| 9,140,355 | B2 | * | 9/2015  | Kim ........................ F16H 61/22 |
| 9,970,536 | B2 | * | 5/2018  | Yamamura ............... F16H 61/18 |
| 10,088,040 | B2 | * | 10/2018 | Mitteer ............... F16H 59/0208 |
| 10,344,849 | B2 | * | 7/2019  | Cimmino ............ F16H 59/0278 |
| 10,634,240 | B2 | * | 4/2020  | Kim .................... F16H 59/0278 |
| 10,718,430 | B2 | * | 7/2020  | Cha ......................... F16H 61/24 |
| 2002/0029951 | A1 | * | 3/2002  | Beattie ................ F16H 59/0204 |
|           |    |   |         | 74/473.18                           |
| 2003/0074999 | A1 |   | 4/2003  | Shioji et al.                       |
| 2018/0245683 | A1 | * | 8/2018  | Kim .................... F16H 59/0278 |

FOREIGN PATENT DOCUMENTS

| JP | 2003-127691 A |   | 5/2003  |                |
| JP | 2010-264950 A |   | 11/2010 |                |
| JP | 2018-160050 A |   | 10/2018 |                |
| KR | 2019064871 A  | * | 6/2019  | ......... F16H 59/0278 |

* cited by examiner

*Primary Examiner* — Gregory Robert Weber
(74) *Attorney, Agent, or Firm* — Studebaker & Brackett PC (57) ABSTRACT

There is provided a shift device including: a shift body configured to be moved by being pivoted or slid to change a shift position; and a locking mechanism provided with a lock member, the lock member being displaced from one side of a movement direction of the shift body to lock movement of the shift body from a predetermined shift position toward both sides in the movement direction.

6 Claims, 9 Drawing Sheets

SHIFT DEVICE

CROSS-REFERENCE TO RELATED APPLICATION

This application is based on and claims priority under 35 USC 119 from Japanese Patent Application No. 2021-030763 filed on Feb. 26, 2021, the disclosure of which is incorporated by reference herein.

BACKGROUND

Technical Field

The present disclosure relates to a shift device in which a shift body is moved to change a shift position of a shift body.

Related Art

In a shift lever device disclosed in Japanese Patent Application Laid-Open (JP-A) No. 2010-264950, an engagement recess of a sliding block engages with a gate pin of a shift lever to lock pivoting of the shift lever from a shift position toward both sides in a pivot (rock) direction.

In this shift lever device, the sliding block is displaced in a pivot radial direction of the shift lever (gate pin) when the engagement recess of the sliding block engages with the gate pin.

SUMMARY

In consideration of the above circumstances, an object of the present disclosure is to obtain a shift device that can be made smaller in size in a height direction of a shift body.

A shift device of a first aspect of the present disclosure includes a shift body configured to be moved by being pivoted or slid to change a shift position, and a locking mechanism provided with a lock member. The lock member is displaced from one side of a movement direction of the shift body to lock movement of the shift body from a predetermined shift position toward both sides in the movement direction.

A shift device of a second aspect of the present disclosure is the shift device of the first aspect of the present disclosure, further including a load-bearing portion configured to bear a load acting on the lock member from the shift body when the lock member locks movement of the shift body.

A shift device of a third aspect of the present disclosure is the shift device of the first aspect or the second aspect of the present disclosure, further including a housing body in which the shift body is housed, and that is provided with the load-bearing portion.

A shift device of a fourth aspect of the present disclosure is the shift device of any one of the first aspect to the third aspect of the present disclosure, further including a support body that is provided to the locking mechanism, that supports the lock member, and that is provided with the load-bearing portion.

A shift device of a fifth aspect of the present disclosure is the shift device of any one of the first aspect to the fourth aspect of the present disclosure, further including a guide portion configured to guide displacement of the lock member.

A shift device of a sixth aspect of the present disclosure is the shift device of any one of the first aspect to the fifth aspect of the present disclosure, further including a housing body that houses the shift body, and a support body that is provided to the locking mechanism, that supports the lock member, and that is fixed to the housing body.

In the shift device of the first aspect of the present disclosure, the shift body is moved by being pivoted or slid to change the shift position of the shift body. The lock member of the locking mechanism locks movement of the shift body from the predetermined shift position toward both movement direction sides.

Note that the lock member is displaced from one side of the movement direction of the shift body to lock movement of the shift body from the predetermined shift position toward both movement direction sides. This enables the lock member to be suppressed from being displaced in a height direction of the shift body, enabling the shift device to be made smaller in size in the height direction of the shift body.

In the shift device of the second aspect of the present disclosure, the load-bearing portion bears the load acting on the lock member from the shift body when the lock member locks movement of the shift body. Thus, the lock member can effectively lock movement of the shift body.

In the shift device of the third aspect of the present disclosure, the shift body is housed in the housing body, and the load-bearing portion is provided to the housing body. Thus, load acting on the lock member from the shift body can be borne by the housing body.

In the shift device of the fourth aspect of the present disclosure, the lock member is supported by the support body of the locking mechanism, and the load-bearing portion is provided to the support body. Thus, load acting on the lock member from the shift body can be borne by the support body.

In the shift device of the fifth aspect of the present disclosure, the guide portion guides the displacement of the lock member. Thus, the lock member can be displaced in a suitable manner.

In the shift device of the sixth aspect of the present disclosure, the shift body is housed in the housing body, the lock member is supported by the support body of the locking mechanism, and the support body is fixed to the housing body. Thus, the shift device can easily be assembled.

BRIEF DESCRIPTION OF THE DRAWINGS

Exemplary embodiments of the present disclosure will be described in detail based on the following figures, wherein.

DETAILED DESCRIPTION

Figure 1:
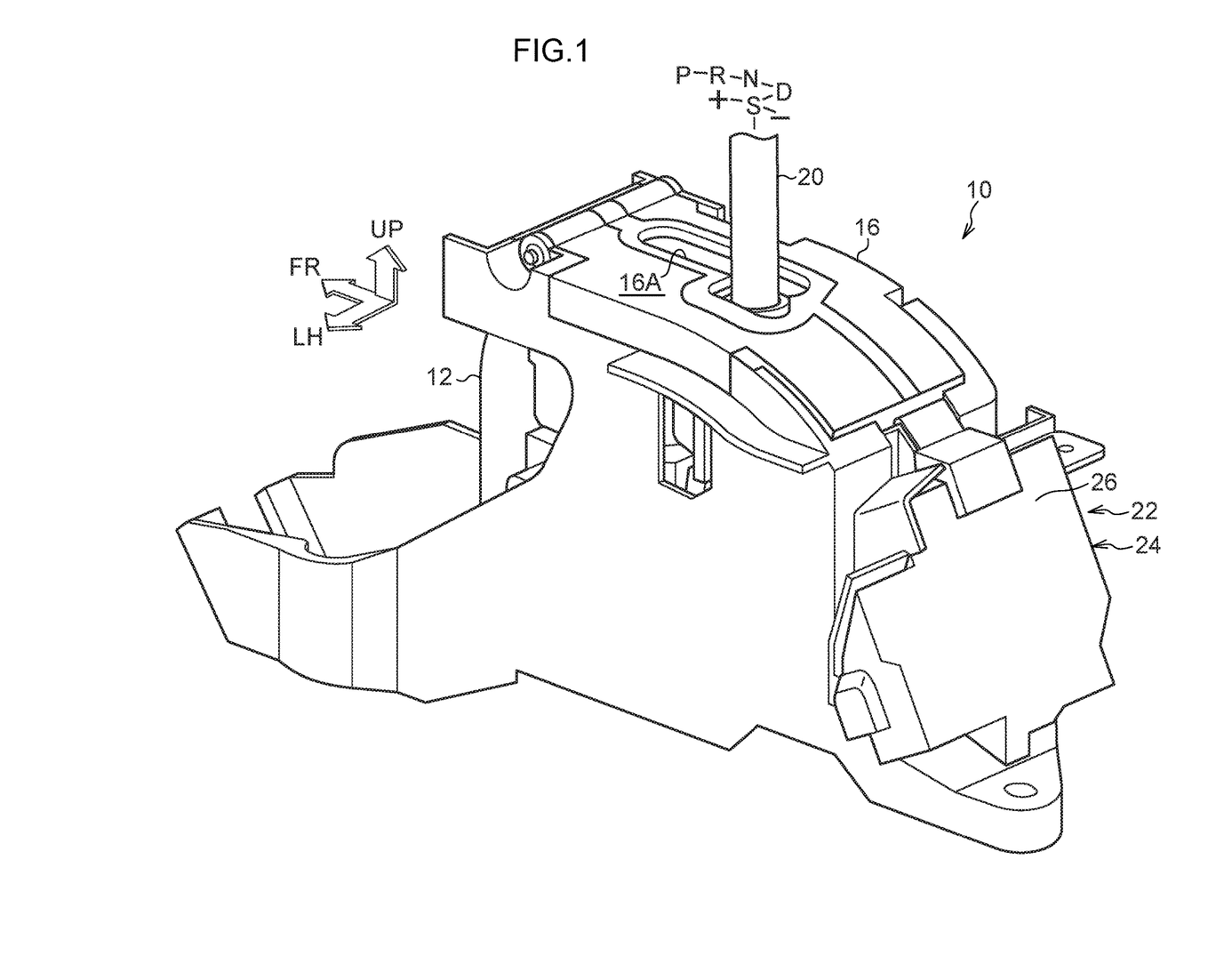
FIG. 1 is a perspective view illustrating a shift device according to an exemplary embodiment of the present disclosure, as viewed obliquely from a rear-left side.
Figure 2:
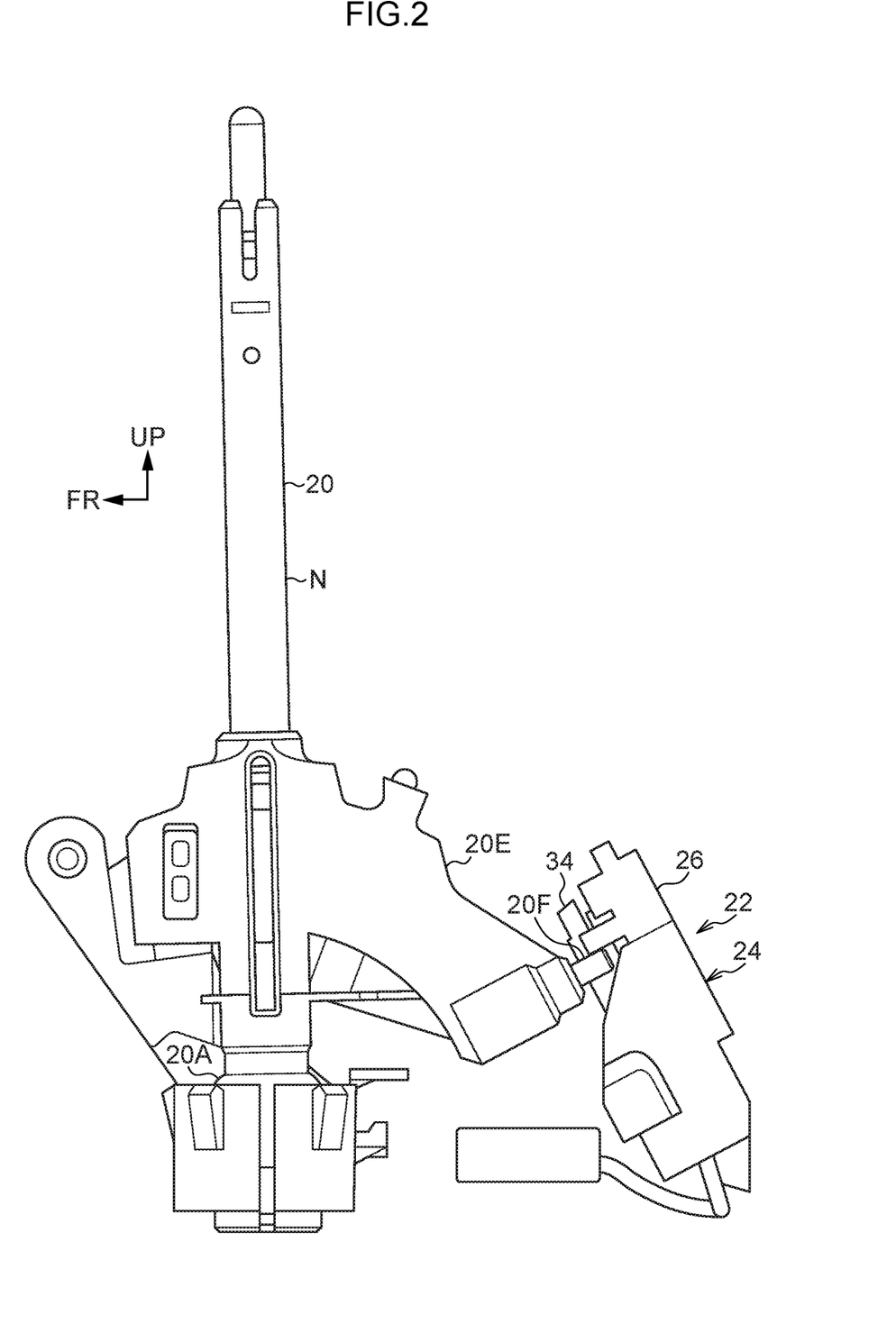
FIG. 2 is a side view illustrating an N-position locking unit and so on of a shift device according to an exemplary embodiment of the present disclosure, as viewed from a left side.

FIG. 1 is a perspective view illustrating a shift device 10 according to an exemplary embodiment of the present disclosure as viewed obliquely from a rear-left side. FIG. 2 is a side view of relevant portions of the shift device 10 as viewed from a left side. Note that in the drawings, the arrow FR indicates a front side of the shift device 10, the arrow LH indicates the left side of the shift device 10, and the arrow UP indicates an upper side of the shift device 10.

The shift device 10 according to the present exemplary embodiment is installed to a console of a vehicle. The front, left, and upper sides of the shift device 10 respectively correspond to front, left, and upper sides of the vehicle.

As illustrated in FIG. 1, the shift device 10 is provided with a substantially rectangular box-shaped plate 12, serving as a housing body. The plate 12 is fixed inside the console and an inner portion of the plate 12 is open to the upper side. A substantially rectangular opening 14 (see FIG. 4A) is formed so as to penetrate a rear wall of the plate 12. The opening 14 opens in an upward direction (an axial direction of the opening 14) on progression toward the rear inside the plate 12.

The plate 12 is formed with a front load-bearing wall 14A that has a substantially U-plate shaped cross-section and serves as a load-bearing portion (first load-bearing portion) at the front side (upper side) of the opening 14. The inside of the front load-bearing wall 14A is open toward the front side. A rear face (lower face) of the front load-bearing wall 14A configures a front face of the opening 14. The rear face of the front load-bearing wall 14A is a planar face running parallel to the axial direction of the opening 14 and the left-right direction. The plate 12 is also formed with a rear load-bearing wall 14B that has an E-plate shaped cross-section and serves as a load-bearing portion (first load-bearing portion) at the rear side (lower side) of the opening 14. The inside of the rear load-bearing wall 14B is open toward the rear side. A front face (upper face) of the rear load-bearing wall 14B configures a rear face of the opening 14. The front face of the rear load-bearing wall 14B is a planar face running parallel to the axial direction of the opening 14 and the left-right direction.

A substantially rectangular plate-shaped gate plate 16, serving as a strengthening member, is fixed to an upper end portion of the plate 12. The gate plate 16 conceals the inside of the plate 12 from the upper side. A gate groove 16A having a predetermined shape is formed so as to penetrate the gate plate 16.

As illustrated in FIG. 1 and FIG. 2, a substantially rod-shaped lever 20, serving as a shift body, is provided inside the plate 12. A substantially spherical rotation shaft 20A is integrally provided to a lower end portion of the lever 20. The rotation shaft 20A is rotatably supported by a lower end portion inside the plate 12. The lever 20 is capable of pivoting (moving) centered on the rotation shaft 20A.

The lever 20 penetrates the gate groove 16A of the gate plate 16. The lever 20 is guided by the gate groove 16A so as to be capable of pivoting in the front-rear direction and the left-right direction (shift directions) over a predetermined range. Thus, in a state in which the lever 20 is not pivoted in the left-right direction, the lever 20 can be pivoted from the front side to the rear side so as to change shift positions of the lever 20 in sequence from a "P" position (park position), to an "R" position (reverse position), an "N" position (neutral position) serving as a predetermined shift position, and a "D" position (drive position). When the lever 20 is pivoted toward the left side (or this may be the right side) from the "D" position, the shift position of the lever 20 is changed to an "S" position (sequential position). When the lever 20 is pivoted toward either the front side or the rear side from the "S" position, the shift position of the lever 20 is changed to either a "+" position (plus position) or a "−" position (minus position) accordingly.

An upper side portion of the lever 20 extends out from the upper side of the console (into the vehicle cabin) so as to be capable of pivoting. The lever 20 can be pivot-operated in a state in which an upper end portion of the lever 20 is being gripped by an occupant (in particular a driver) of the vehicle.

An extension portion 20E is integrally provided to a lower portion of the lever 20. The extension portion 20E extends toward the rear side. A circular pillar-shaped lock pin 20F (see FIG. 4A), serving as a lockable portion, is fixed to a rear end portion of the extension portion 20E. The lock pin 20F projects upward on progression toward the rear. In cases in which the lever 20 is disposed in a shift position further toward the rear side than the "P" position, the lock pin 20F projects toward the upper side (rear side) of the plate 12 through the opening 14 in the plate 12.

Figure 6:
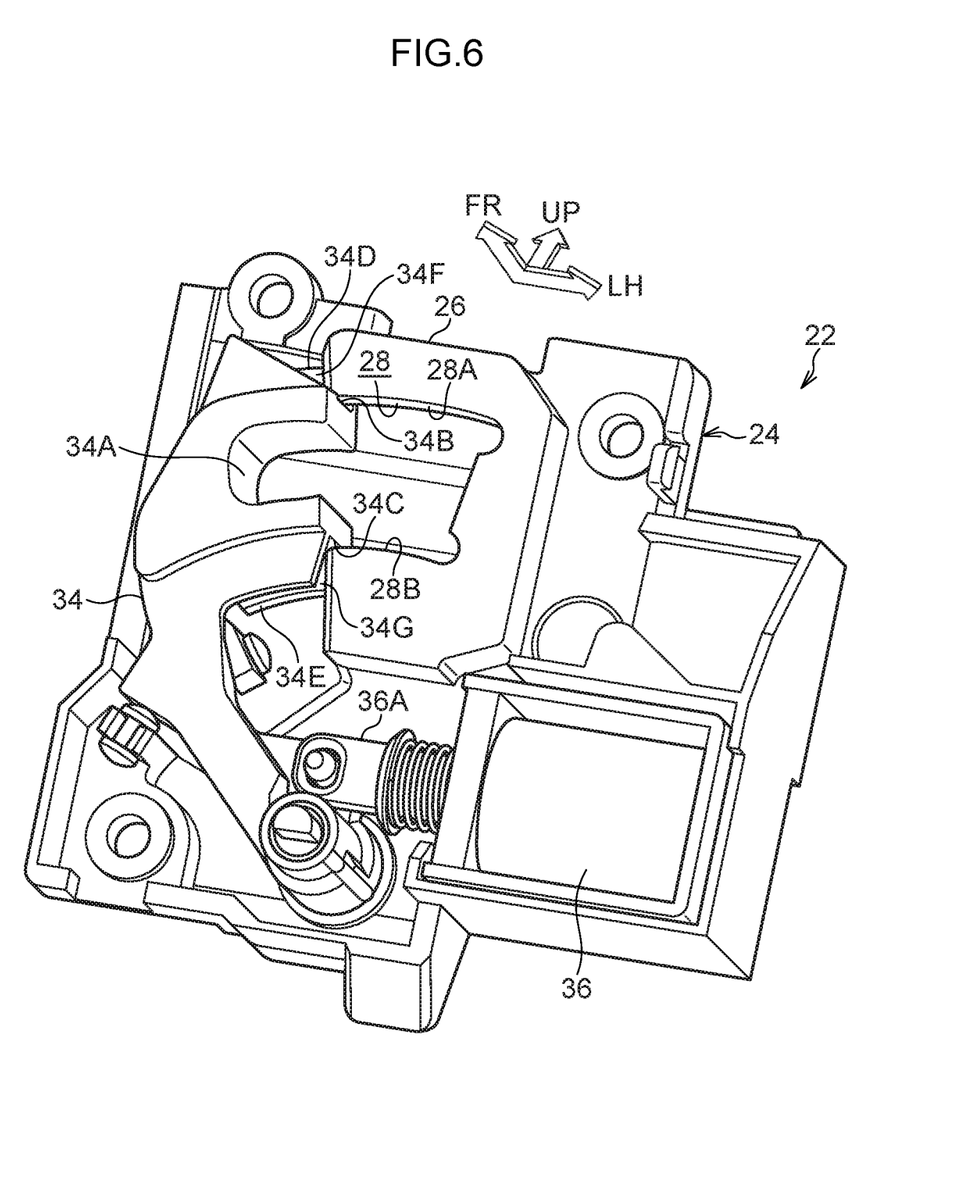
FIG. 6 is a perspective view illustrating an N-position locking unit of a shift device according to an exemplary embodiment of the present disclosure, as viewed obliquely from a front-left side.

An N-position locking unit 22 (see FIG. 3B, FIG. 4A, and FIG. 6), serving as a locking mechanism, is provided at the rear side of the plate 12.

The N-position locking unit 22 is provided with a substantially rectangular box-shaped case 24, serving as a support body. The strength of the case 24 is a high level that is equal to the strength of the plate 12. The case 24 is fixed to the plate 12 by screw-fastening, and the N-position locking unit 22 is thereby fixed to the plate 12. The case 24 is disposed so as to slope upward on progression toward the front side. The inside of the case 24 is open toward the lower side.

A substantially rectangular box-shaped insertion box 26 (see FIG. 5A and FIG. 5B), serving as a load-bearing portion (second load-bearing portion) is formed to a front portion (upper portion) of the case 24. An inner portion of the insertion box 26 is open toward the right side, and the insertion box 26 is inserted into the opening 14 in the plate 12. A front face (upper face) of the insertion box 26 configures a planar face that fits together with the rear face of the front load-bearing wall 14A of the opening 14. Similarly, a rear face (lower face) of the insertion box 26 configures a planar face that fits together with the front face of the rear load-bearing wall 14B of the opening 14. Thus, the insertion box 26 is fitted between the rear face of the front load-bearing wall 14A and the front face of the rear load-bearing wall 14B in substantially the front-rear direction.

A substantially rectangular insertion hole 28 is formed so as to penetrate a lower wall of the insertion box 26. The insertion hole 28 exposes the inside of the insertion box 26 toward the lower side and is open toward the right side. A front face and a rear face of the insertion hole 28 respectively configure a front peripheral face 28A and rear peripheral face 28B, each serving as a guide portion (first guide portion). The front peripheral face 28A and the rear peripheral face 28B are curved along a swing direction of an N-position link 34, described below.

Lower faces inside the insertion box 26 are integrally provided with a front protrusion 26A and a rear protrusion 26B (see FIG. 5A), that each have a substantially rectangular cross-section and serve as a guide portion (second guide portion), at the front side and rear side of the insertion hole 28 respectively. The front protrusion 26A and the rear protrusion 26B each project toward the upper side, have an upper face curved in bulging shape, and extend along the swing direction of the N-position link 34. A front portion and a rear portion of an upper face inside the insertion box 26 respectively configure a front contact face 26C and a rear contact face 26D (see FIG. 5A), each serving as a guide portion (third guide portion). The front contact face 26C and the rear contact face 26D are planar faces.

The N-position link 34 has substantially elongated plate shape, serves as a lock member, and is provided at the lower side of the case 24. The N-position link 34 extends upward on progression toward the front side along the case 24. A rear end portion (lower end portion) of the N-position link 34 is supported by a rear end portion of the case 24 so as to be capable of swinging (being displaced) in the left-right direction within a predetermined range. The N-position link 34 is biased toward the right side, and further swinging toward the right side is stopped.

A lock frame 34A that has a substantially U-plate shaped cross-section and serves as a lock portion is provided to a front portion (upper portion) of the N-position link 34. The lock frame 34A is slightly inserted into the insertion hole 28 in the insertion box 26 from the right side. The inside of the lock frame 34A is open toward the left side. In cases in which the lever 20 is disposed at the "N" position, the inside of the lock frame 34A opposes the right side of the lock pin 20F of the lever 20. A front face (upper face) and a rear face (lower face) of the lock frame 34A respectively configure a front side face 34B and a rear side face 34C (see FIG. 5A and FIG. 5B), each serving as a guided portion (first guided portion). The front side face 34B and the rear side face 34C are curved along the swing direction of the N-position link 34, and respectively oppose the front peripheral face 28A and the rear peripheral face 28B of the insertion hole 28 in substantially the front-rear direction.

Respective upper ends of a front wall and a rear wall of the lock frame 34A are integrally provided with a front plate 34D and a rear plate 34E that each have a substantially rectangular plate shape and serve as an insertion portion. The front plate 34D and the rear plate 34E project toward the front side and the rear side respectively. The front plate 34D and the rear plate 34E are slightly inserted into the insertion box 26 from the right side. A front face of the front plate 34D and a rear face of the rear plate 34E are curved along the swing direction of the N-position link 34.

A lower face of the front plate 34D and a lower face of the rear plate 34E respectively configure a front sliding face 34F and a rear sliding face 34G (see FIG. 5A), each serving as a guided portion (second guided portion). The front sliding face 34F and the rear sliding face 34G are planar faces, and respectively oppose the front protrusion 26A and the rear protrusion 26B of the insertion box 26 in substantially the up-down direction. An upper face of the front plate 34D and an upper face of the rear plate 34E are integrally provided with a front protruding portion 34H and a rear protruding portion 34I (see FIG. 5A) that each have a substantially rectangular cross-section and serve as a guided portion (third guided portion). The front protruding portion 34H and the rear protruding portion 34I extend along the swing direction of the N-position link 34. The front protruding portion 34H and the rear protruding portion 34I each project toward the upper side and have an upper face curved in bulging shape. The front protruding portion 34H and the rear protruding portion 34I respectively oppose the front contact face 26C and the rear contact face 26D of the insertion box 26 in substantially the up-down direction.

A solenoid 36, serving as an actuation device, is fixed to a rear portion of the case 24 on the left side of the N-position link 34. A plunger 36A of the solenoid 36 extends toward the right, and a right end portion of the plunger 36A is mechanically coupled to a rear portion of the N-position link 34. The right end portion of the plunger 36A is capable of rotating and also capable of sliding with respect to the rear portion of the N-position link 34. When the N-position locking unit 22 is actuated, a current is passed through the solenoid 36, and the plunger 36A is pulled toward the left by magnetic force generated by the solenoid 36. The N-position link 34 is thereby swung toward the left side by the plunger 36A so as to be placed at a locking position (see FIG. 3A and FIG. 4B).

Figure 3A:
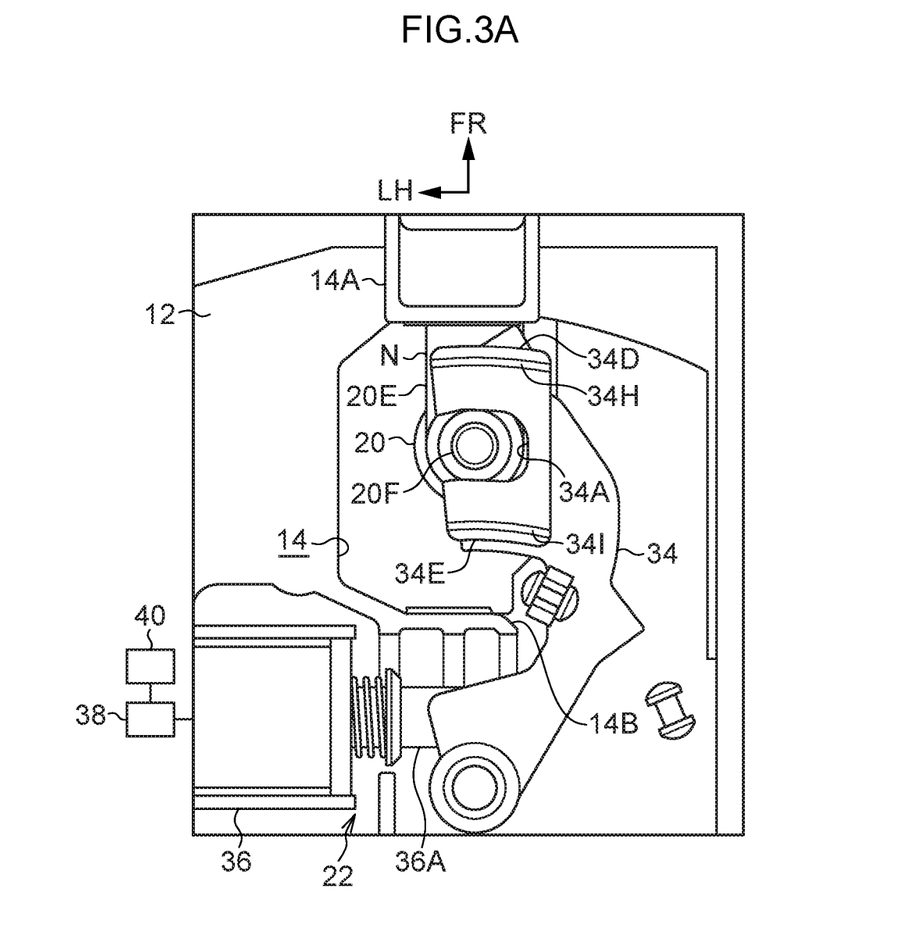
FIG. 3A and FIG. 3B are face-on views illustrating actions of an N-position locking unit of a shift device according to an exemplary embodiment of the present disclosure as viewed from an upper side, FIG. 3A illustrating a locked state, and FIG. 3B illustrating an unlocked state.

As illustrated in FIG. 3A, the solenoid 36 of the N-position locking unit 22 is electrically connected to a control device 38 of the vehicle. An N-position locking switch 40 of the vehicle, serving as an actuation operation section, is electrically connected to the control device 38. The N-position locking switch 40 can be activated and deactivated by being operated by an occupant. When the N-position locking switch 40 is activated, a current is passed through the solenoid 36 (the N-position locking unit 22 is actuated) under the control of the control device 38.

Next, explanation follows regarding operation of the present exemplary embodiment.

In the shift device 10 with the above configuration, in cases in which the N-position locking switch 40 is activated while the lever 20 is disposed at the "N" position, the N-position locking unit 22 is actuated and a current is passed through the solenoid 36. Thus, the N-position link 34 is swung toward the left side by the plunger 36A of the solenoid 36 so as to be placed at the locking position (see FIG. 3A and FIG. 4B). Since the lock pin 20F of the lever 20 is thereby placed inside the lock frame 34A of the N-position link 34, pivoting of the lock pin 20F toward the front side and the rear side is restricted by the front wall and the rear wall of the lock frame 34A respectively, such that pivoting of the lever 20 toward the front side (the "R" position side) and the rear side (the "D" position side) is locked.

Figure 3B:
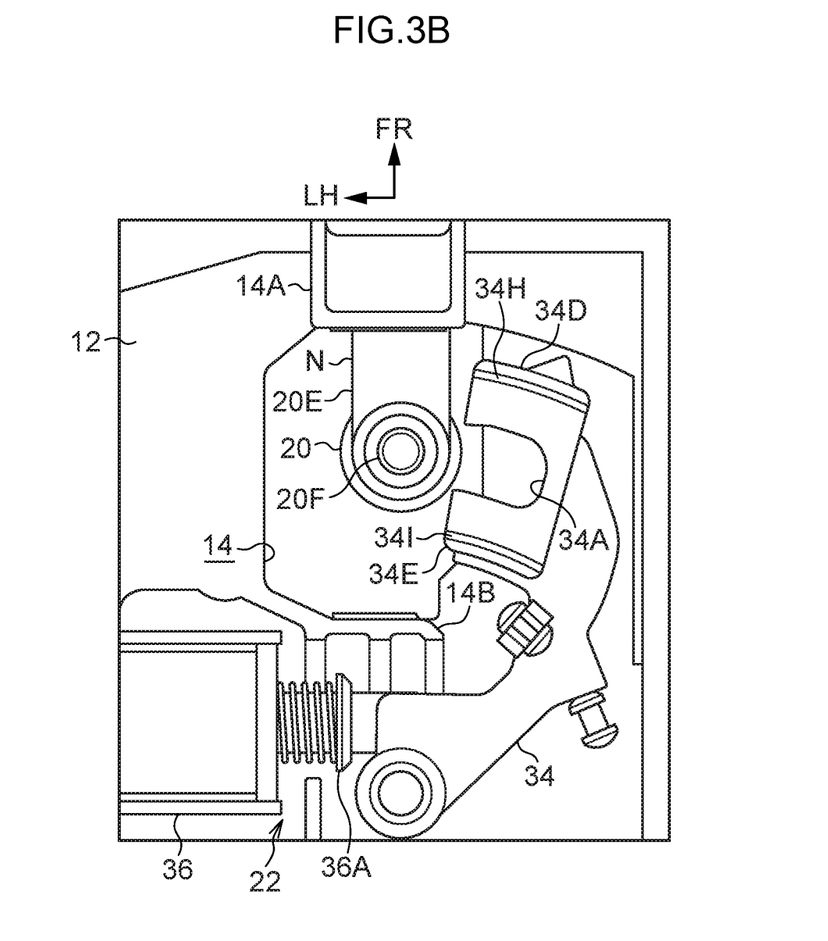
Figure 4A:
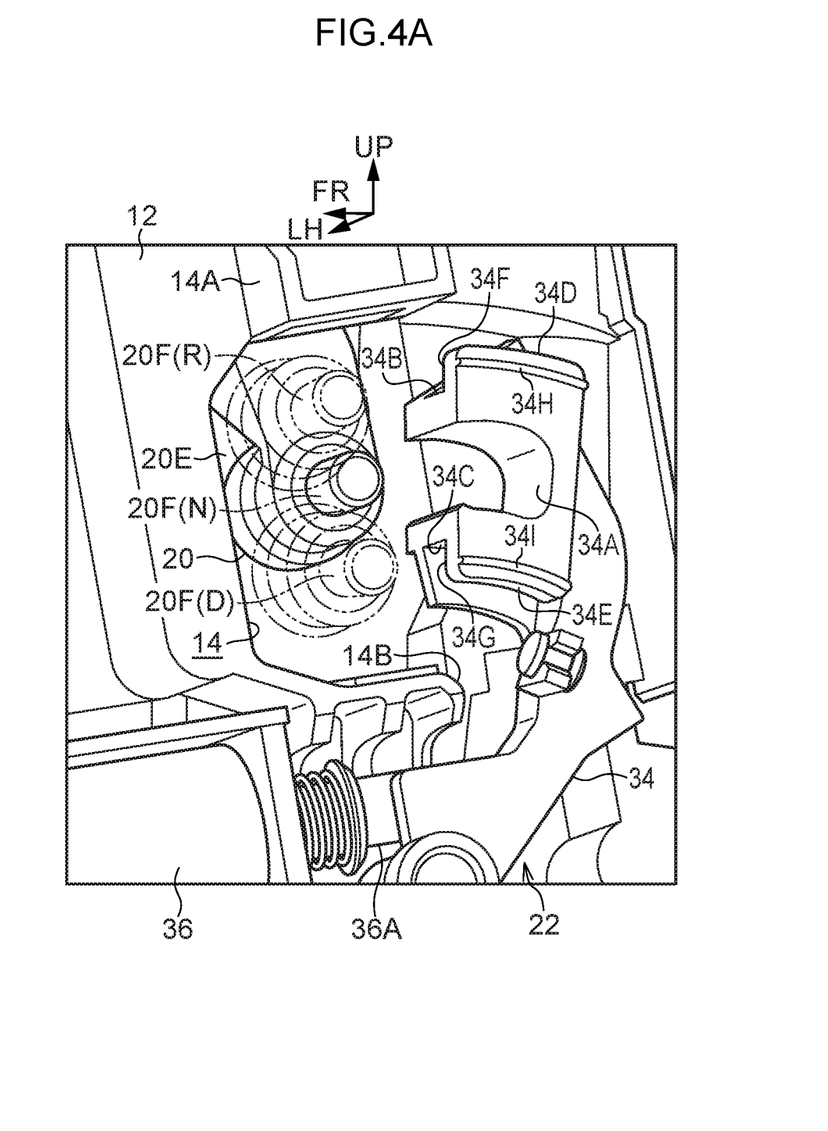
FIG. 4A and FIG. 4B are perspective views illustrating actions of an N-position locking unit of a shift device according to an exemplary embodiment of the present disclosure as viewed obliquely from a rear-left side, FIG. 4A illustrating an unlocked state, and FIG. 4B illustrating a locked state.
Figure 4B:
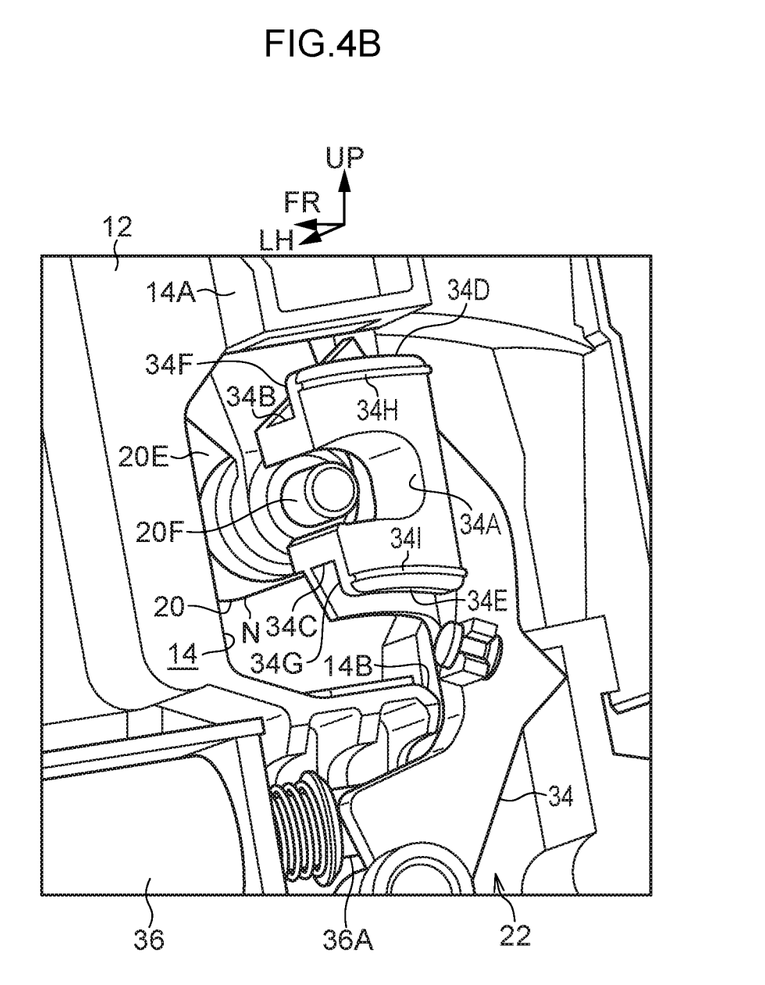

On the other hand, in cases in which the N-position locking switch 40 is not activated (remains deactivated) while the lever 20 is disposed at the "N" position, the N-position locking unit 22 is not actuated and a current is not passed through the solenoid 36, and so the N-position link 34 is not swung toward the left side (see FIG. 3B and FIG. 4A). Thus, pivoting of the lock pin 20F toward the front side and the rear side is not restricted, and pivoting of the lever 20 toward the front side (the "R" position side) and the rear side (the "D" position side) is unlocked.

Note that in the N-position locking unit 22, the N-position link 34 is swung from one side (the right side) of the swing direction (front-rear direction) of the lever 20 so as to lock pivoting of the lever 20 (lock pin 20F) toward both swing direction sides from the "N" position. This enables swinging of the N-position link 34 in a height direction of the lever 20 (a pivot radial direction of the lock pin 20F) to be suppressed, thereby enabling the shift device 10 to be made smaller in size in the height direction of the lever 20.

Figure 5A:
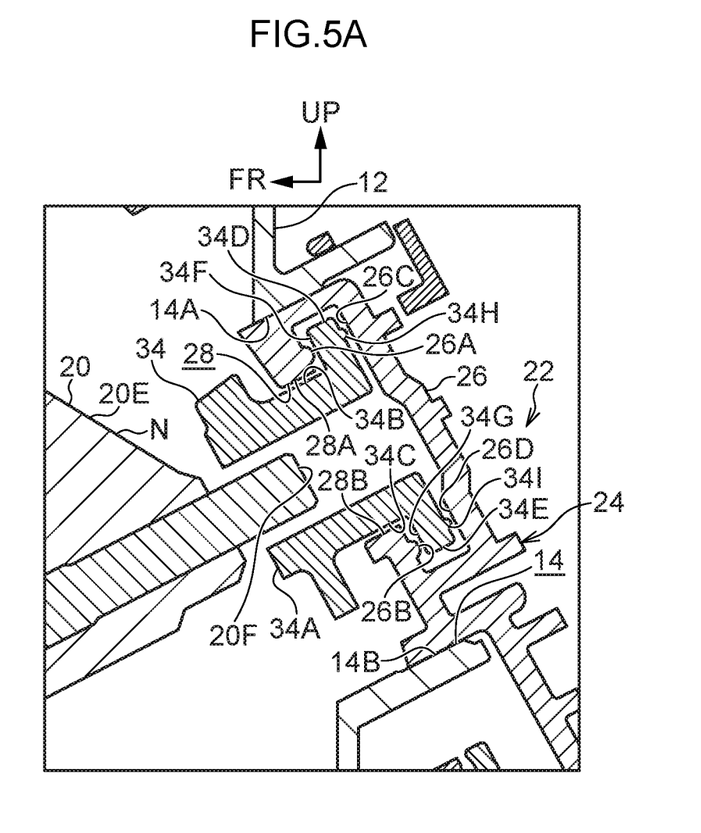
FIG. 5A and FIG. 5B are cross-sections illustrating a locked state of an N-position locking unit of a shift device according to an exemplary embodiment of the present disclosure, FIG. 5A being a diagram viewed from a left side, and FIG. 5B being a diagram viewed from an upper side.
Figure 5B:
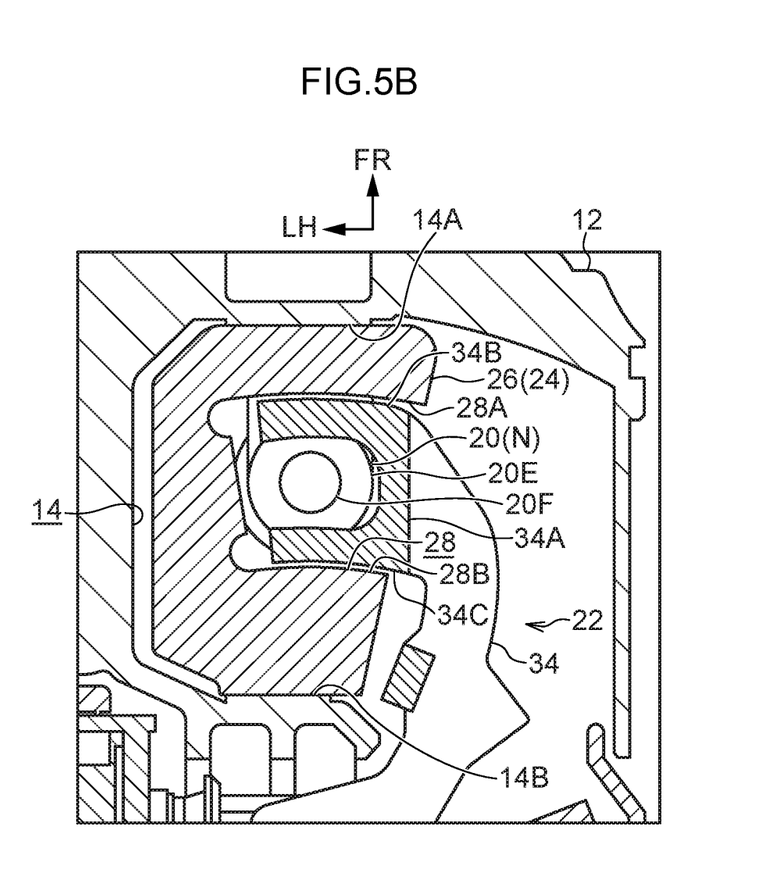

Moreover, when the N-position link 34 locks pivoting of the lever 20 toward the front side from the "N" position, load acting on the front wall of the lock frame 34A of the N-position link 34 from the lock pin 20F of the lever 20 is borne by a front portion of the insertion box 26 of the case 24 and by the front load-bearing wall 14A of the plate 12 (see FIG. 5A and FIG. 5B). Furthermore, when the N-position link 34 locks pivoting of the lever 20 toward the rear side from the "N" position, load acting on the rear wall of the lock frame 34A from the lock pin 20F is borne by a rear portion of the insertion box 26 and by the rear load-bearing wall 14B of the plate 12 (see FIG. 5A and FIG. 5B). This enables the N-position link 34 to effectively lock pivoting of the lever 20 toward the front side and the rear side from the "N" position.

Furthermore, when the N-position link 34 locks pivoting of the lever 20 from the "N" position, the lock pin 20F of the lever 20 is inserted into the lock frame 34A of the N-position link 34 (see FIG. 5A). This enables load from the lock pin 20F to be made to act effectively on the lock frame 34A, enables load from the lock pin 20F to be effectively borne by the insertion box 26 of the case 24 and by the front load-bearing wall 14A and rear load-bearing wall 14B of the plate 12 through the lock frame 34A, and enables the N-position link 34 to effectively lock pivoting of the lever 20 toward the front side and the rear side from the "N" position.

Moreover, the insertion box 26 of the case 24 is fitted between the front load-bearing wall 14A and the rear load-bearing wall 14B of the plate 12 in substantially the front-rear direction (see FIG. 5A and FIG. 5B). This enables rattling of the insertion box 26 in substantially the front-rear direction between the front load-bearing wall 14A and the rear load-bearing wall 14B to be limited, enables load from the lock pin 20F of the lever 20 to be even more effectively borne by the insertion box 26 and by the front load-bearing wall 14A and rear load-bearing wall 14B through the lock frame 34A of the N-position link 34, and enables the N-position link 34 to even more effectively lock pivoting of the lever 20 toward the front side and the rear side from the "N" position.

Moreover, when the N-position link 34 is swung, the front side face 34B and the rear side face 34C of the N-position link 34 (lock frame 34A) respectively slide with respect to the front peripheral face 28A and the rear peripheral face 28B of the case 24 (insertion box 26), such that the front peripheral face 28A and the rear peripheral face 28B guide this swinging of the N-position link 34 (see FIG. 5A and FIG. 5B). This enables the N-position link 34 to be swung in a suitable manner.

Furthermore, when the N-position link 34 is swung, the front sliding face 34F and the rear sliding face 34G of the N-position link 34 (the front plate 34D and the rear plate 34E) respectively slide with respect to the front protrusion 26A and the rear protrusion 26B of the case 24 (insertion box 26), such that the front protrusion 26A and the rear protrusion 26B guide this swinging of the N-position link 34 (see FIG. 5A). This enables the N-position link 34 to be swung in an even more suitable manner.

Moreover, when the N-position link 34 is swung, the front protruding portion 34H and the rear protruding portion 34I of the N-position link 34 (the front plate 34D and the rear plate 34E) slide with respect to the front contact face 26C and the rear contact face 26D of the case 24 (insertion box 26), such that the front contact face 26C and the rear contact face 26D guide this swinging of the N-position link 34 (see FIG. 5A). This enables the N-position link 34 to be swung in an even more suitable manner.

Moreover, the shift device 10 is configured by fixing the case 24 of the N-position locking unit 22 to the plate 12 where the lever 20 is housed. Thus, the shift device 10 can be easily assembled.

Note that the lever 20 (shift body) is pivoted in the present exemplary embodiment. However, a shift body may be configured to as to be slid.

Furthermore, the predetermined shift position is the "N" position in the present exemplary embodiment. However, the predetermined shift position may be set to a shift position other than the "N" position.

The shift device 10 is installed to the console in the present exemplary embodiment. However, the shift device 10 may be installed to an instrument panel or to a steering column.

What is claimed is:

1. A shift device comprising:
   a shift body configured to be moved by being pivoted or slid to change a shift position, configured to be moved from a predetermined shift position toward both sides in a movement direction of the shift body, and provided with a lockable portion;
   a locking mechanism provided with a lock member that has one wall disposed at one side in the movement direction and another wall disposed at another side in the movement direction, the lock member being displaced from one side of the movement direction and the one wall and the other wall being disposed at both sides of the lockable portion in the movement direction to lock movement of the shift body from the predetermined shift position toward both sides in the movement direction, and
   a load-bearing portion disposed at the one side of the one wall in the movement direction and the other side of the other wall and configured to bear a load acting on the load-bearing portion via the lock member from the shift body when the lock member locks movement of the shift body.

2. The shift device of claim 1, further comprising a housing body in which the shift body is housed, and that is provided with the load-bearing portion.

3. The shift device of claim 1, further comprising a support body that is provided to the locking mechanism, that supports the lock member, and that is provided with the load-bearing portion.

4. The shift device of claim 1, further comprising: a housing body that houses the shift body; and a support body that is provided to the locking mechanism, that supports the lock member, and that is fixed to the housing body.

5. The shift device of claim 1, wherein the lock member is configured to pivotally move in an arc-shaped path across the movement direction of the shift body.

6. A shift device comprising:
   a shift body configured to be moved by being pivoted or slid to change a shift position, configured to be moved from a predetermined shift position toward both sides in a movement direction of the shift body, and provided with a lockable portion;
   a locking mechanism provided with a lock member that has one wall disposed at one side in the movement direction and another wall disposed at another side in the movement direction, the lock member being displaced from one side of the movement direction and the one wall and the other wall being disposed at both sides of the lockable portion in the movement direction to lock movement of the shift body from the predetermined shift position toward both sides in the movement direction, and a guide portion configured to guide displacement of the one wall and the other wall separately.

\* \* \* \* \*